3,387,050
PRODUCTION OF STILBENE AND BIBENZYL

John R. Norell, Donald L. Crain, and Roger F. Kleinschmidt, Bartlesville, Okla., assignors to Phillips Petroleum Company, a corporation of Delaware
No Drawing. Filed Oct. 22, 1965, Ser. No. 502,525
3 Claims. (Cl. 260—668)

ABSTRACT OF THE DISCLOSURE

Unsaturated compounds such as 1,2-bis(3-cyclohexen-1-yl) ethylene are dehydrogenated to form other unsaturated compounds such as stilbene and bibenzyl.

---

This invention relates to a novel process for the production of stilbene and bibenzyl including methyl and ethyl derivatives thereof. In one aspect this invention relates to the dehydrogenation of 1,2-bis(3-cyclohexen-1-yl) ethylene to produce stilbene and bibenzyl. In another aspect this invention relates to the catalytic conversion of 1,2-bis(3-cyclohexen-1-yl)ethylene to produce high yields of bibenzyl and stilbene.

The compound stilbene, because of its unsaturated character, is very reactive and may be employed as a starting material in various organic syntheses to produce products which may be used in the manufacture of dyes, paints, resins, and various other similar products. It is also useful as an intermediate in the preparation of lithio initiators for the polymerization of butadiene and other conjugated dienes. However, large scale utilization of stilbene in organic synthesis has been prevented by the lack of a suitable process for producing stilbene in quantities which are commercially attractive.

It is well known in the art that stilbene may be produced from the dehydrogenation of binbenzyl. However, the yield of stilbene has been too small to be of any particular value commercially.

It is an object of the present invention to provide a method for producing stilbene and bibenzyl including methyl and ethyl derivatives thereof from 1,2-bis(3-cyclohexen-1-yl)ethylene in relatively high yields, these yields being sufficiently large to permit the use of the highly reactive stilbene in organic synthesis operating on a commercial scale.

Further objects and many of the attendant advantages of this invention will be readily appreciated as the same becomes better understood by reference to the following detailed description.

Broadly speaking, the present invention comprises a process for producing compounds characterized by the formulas:

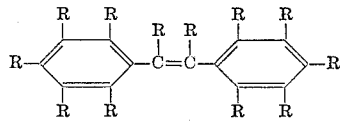

and

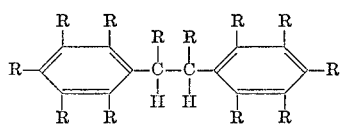

by dehydrogenating a compound characterized by the formula

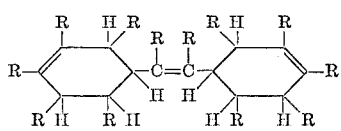

with a catalyst composite comprising alumina and an oxide of chromium, wherein R is at least one member selected from the group consisting of hydrogen, methyl and ethyl, the total number of carbon atoms in all of said R groups being preferably not greater than 8.

Representative starting materials in this process are as follows:

1,2-bis(3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl)ethylene
1,2-bis(5-ethyl-3-cyclohexen-1-yl)ethylene
1,2-bis(6-methyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
2,3-bis(4-methyl-3-cyclohexen-1-yl)-2-butene
1,2-bis(5,6-dimethyl-3-cyclohexen-1-yl)ethylene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)ethylene
1-(3-cyclohexen-1-yl)-2-(2-methyl-3-cyclohexen-1-yl) ethylene The starting materials of this invention and their preparation are fully and completely described in U.S. application Ser. No. 502,544, filed Oct. 22, 1965, of D. L. Crain and of common assignee. The above referenced application discloses, inter alia, the preparation of the starting materials of this invention by contacting an alkenyl-substituted cycloalkene with a molybdenum or tungsten containing catalyst.

We have discovered that the use of this catalytic material under selected conditions of operation gives a product which comprises bibenzyl and trans-stilbene in a weight ratio of approximately 2:1.

This catalytic material may be prepared by many alternative methods. The alumina used as a support may be obtained by the calcination of treated natural alumina deposits such as bauxite or by the precipitation of hydrated alumina from either a solution of an aluminum salt such as aluminum sulfate, chloride, acetate, bromide, etc., or from an aluminum compound such as sodium aluminate, followed by washing, drying, and calcining. A particularly suitable type of alumina is the "activated alumina" of commerce. Promoting agents such as iron and potassium oxide can also be present in the supported chromia catalyst.

The alumina is the preferred supporting material, although other supports, preferably containing a major portion of alumina can be employed. The amount of chromia as $Cr_2O_3$ present in the catalyst can very over a wide range, but will generally range from about 5–40 weight percent of the catalyst composite.

The operating conditions of temperature, pressure and space velocity which may be employed will vary within ranges as defined below. The process can be carried out as a batch or continuous process but it is preferred to effect the dehydrogenation in a continuous manner. Continuous operation can be carried out by contacting the feedstock with a supported chromia catalyst which is employed as a bed in the reaction zone through which the feedstock is passed. The temperature at which the supported chromia catalyst is contacted with the feedstock will generally range from 400–800° C., preferably from 500–600° C. The reaction times will generally range from a few seconds to several hours, with longer reaction times being employed at the lower temperatures and vice versa. Generally speaking, reaction times will not exceed 30 minutes, and will frequently be less than 5 minutes.

The following compounds are representative of the products which can be formed by following the process of this invention:

stilbene
2,2'-dimethylstilbene
3,3'-diethylstilbene
4,4'-dimethylstilbene
α,α'-diethylstilbene
2,2',6,6'-tetramethylstilbene
α,α',3,3'-tetramethylstilbene
α,α',4,4'-tetramethylstilbene
2,2',3,3'-tetramethylstilbene
2,2',3,3',6,6'-hexamethylstilbene
2,2',6,6'-tetraethylstilbene
α,α',4,4'-tetraethylstilbene
2,3'-dimethyl-6-ethylstilbene
2-methylstilbene and bibenzyl
2,2'-dimethylbibenzyl
3,3'-diethylbibenzyl
4,4'-dimethylbibenzyl
α,α'-diethylbibenzyl
2,2',6,6'-tetramethylbibenzyl
α,α',3,3'-tetramethylbibenzyl
α,α',4,4'-tetramethylbibenzyl
2,2',3,3'-tetramethylbibenzyl
2,2',3,3',6,6'-hexamethylbibenzyl
2,2',6,6'-tetraethylbibenzyl
α,α',4,4'-tetraethylbibenzyl
2,3'-dimethyl-6-ethylbibenzyl
2-methylbibenzyl The following example is typical of the result obtainable when dehydrogenating 1,2-bis(3-cyclohexen-1-yl)ethylene in accordance with the process of the present invention.

EXAMPLE

A run was carried out in which 1,2-bis(3-cyclohexen-1-yl)ethylene (BCE) was converted to a mixture comprising stilbene and bibenzyl according to the process of this invention.

In this run, a bed of 12 percent chromia on alumina catalyst was heated to 512° C. (953° F.), and 33.2 grams (0.2 mol) of BCE was added dropwise to the hot bed. The effluent was collected in a graduated cylinder, and the off gas was passed through a Dry-Ice-acetone bath and a wet test meter. Nitrogen was also passed through the bed at a rate of 0.072 liter per minute.

The rate at which the BCE was dropped onto the hot catalyst bed was 50 drops per minute during the first 11.5 minutes, after which the rate was reduced to 44 drops per minute. A total of 60.5 minutes was required for the addition of the 0.2 mol of BCE.

Approximately 25 ml. of a tan liquid which partially crystallized was collected. Filtration of the mixture gave crystals which were recrystallized from ethanol to give 2.63 grams of white crystals melting over the range 50–70° C. which were dried and then redissolved in benzene. Chromatographic analysis of this benzene solution on a silicone rubber column showed the crystals to comprise 64 percent bibenzyl and 36 percent trans-stilbene.

Obviously many modifications and variations of the present invention are possible in the light of the above teachings. It is therefore to be understood that within the scope of the appended claims the invention may be practiced otherwise than as specifically described herein.

We claim:
1. A process for producing compounds characterized by the formulas:

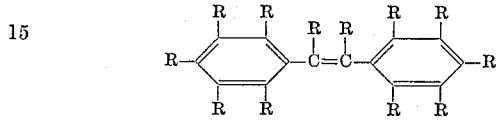

and

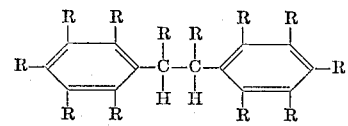

said process comprising the step of dehydrogenating a compound characterized by the formula

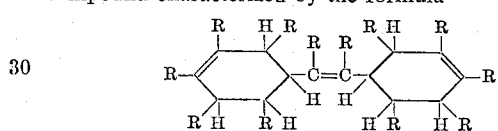

with a catalyst composite comprising alumina and an oxide of chromium, wherein R is a member selected from the group consisting of hydrogen, methyl and ethyl.

2. A process for producing stilbene and bibenzyl which comprises dehydrogenating 1,2-bis(3-cyclohexen-1-yl)ethylene in the presence of a catalyst composite comprising alumina and $Cr_2O_3$ wherein the $Cr_2O_3$ is present in the amount of 5–40 weight percent of the catalyst composite.

3. A process for producing stilbene and bibenzyl which comprises dehydrogenating 1,2-bis(3-cyclohexen-1-yl)ethylene in the presence of a catalyst composite comprising 12 percent by weight $Cr_2O_3$ on alumina at a temperature in a range of about 400–800° C. and recovering the product comprising a mixture of bibenzyl and stilbene.

References Cited
UNITED STATES PATENTS

| | | | |
|---|---|---|---|
| 3,071,629 | 1/1963 | White et al. | 260—668 |
| 3,092,672 | 6/1963 | Klass | 260—668 |
| 3,228,992 | 1/1966 | Myers | 260—668 |

DELBERT E. GANTZ, *Primary Examiner.*

PAUL M. COUGHLAN, Jr., *Examiner.*

C. R. DAVIS, *Assistant Examiner.*